(12) United States Patent
Clement et al.

(10) Patent No.: US 9,385,786 B2
(45) Date of Patent: Jul. 5, 2016

(54) METHOD AND APPARATUS FOR CHARGING A BATTERY IN A MOBILE DEVICE THROUGH A NEAR FIELD COMMUNICATION (NFC) ANTENNA

(71) Applicant: Marvell World Trade Ltd., St. Michael (BB)

(72) Inventors: Patrick Clement, Belmont (CH); Antoine Moret, Preverenges (CH)

(73) Assignee: Marvell World Trade Ltd., St. Michael (BB)

( * ) Notice: Subject to any disclaimer, the term of this patent is extended or adjusted under 35 U.S.C. 154(b) by 255 days.

(21) Appl. No.: 13/706,509

(22) Filed: Dec. 6, 2012

(65) Prior Publication Data

US 2013/0157565 A1    Jun. 20, 2013

Related U.S. Application Data

(60) Provisional application No. 61/570,767, filed on Dec. 14, 2011.

(51) Int. Cl.
*H04B 5/00* (2006.01)
*H02J 7/00* (2006.01)
*H02J 5/00* (2016.01)
*H02J 7/02* (2016.01)

(52) U.S. Cl.
CPC .............. *H04B 5/0037* (2013.01); *H02J 5/005* (2013.01); *H02J 7/0052* (2013.01); *H02J 7/025* (2013.01); *H02J 7/0044* (2013.01)

(58) Field of Classification Search
CPC ....... H02J 7/0052; H02J 7/025; H02J 7/0044; H04B 5/0037
USPC .......................................... 455/41.1; 320/108
See application file for complete search history.

(56) References Cited

U.S. PATENT DOCUMENTS

| | | | |
|---|---|---|---|
| 2004/0132407 A1 | 7/2004 | Hein-Magnussen et al. | |
| 2006/0182142 A1 | 8/2006 | Schmidt | |
| 2007/0136501 A1 | 6/2007 | Chang et al. | |
| 2007/0210162 A1 | 9/2007 | Keen et al. | |
| 2008/0113791 A1 | 5/2008 | Williams et al. | |
| 2009/0096413 A1* | 4/2009 | Partovi et al. | 320/108 |
| 2009/0143104 A1 | 6/2009 | Loh et al. | |

(Continued)

FOREIGN PATENT DOCUMENTS

| | | |
|---|---|---|
| CN | 101573851 A | 11/2009 |
| DE | 102004039651 | 3/2006 |

(Continued)

OTHER PUBLICATIONS

The PCT Search Report and Written Opinion mailed Jun. 7, 2013 for PCT application No. PCT/IB2012/002636, 14 pages.

(Continued)

*Primary Examiner* — Wesley Kim
*Assistant Examiner* — Dong-Chang Shiue

(57) ABSTRACT

A near field communication (NFC) antenna in a mobile device is used to wirelessly charge a battery in the mobile device by placing the mobile device on, or in very close proximity to, a charging station that emits an electromagnetic field. An induced current from the NFC antenna is detected that is above a predetermined threshold for longer than a predetermined duration. The induced current is used to charge the battery in the mobile device.

20 Claims, 5 Drawing Sheets

(56) References Cited

U.S. PATENT DOCUMENTS

| | | | |
|---|---|---|---|
| 2009/0227205 A1 | 9/2009 | Rofougaran | |
| 2009/0325491 A1 | 12/2009 | Bell et al. | |
| 2010/0072825 A1* | 3/2010 | Azancot et al. | 307/104 |
| 2010/0074262 A1 | 3/2010 | Breit et al. | |
| 2010/0081374 A1* | 4/2010 | Moosavi | 455/41.1 |
| 2010/0133338 A1 | 6/2010 | Brown et al. | |
| 2010/0167643 A1 | 7/2010 | Hirsch | |
| 2010/0292556 A1 | 11/2010 | Golden | |
| 2011/0034126 A1 | 2/2011 | Higgins et al. | |
| 2011/0076943 A1 | 3/2011 | Chang | |
| 2011/0165896 A1 | 7/2011 | Stromberg et al. | |
| 2011/0231509 A1 | 9/2011 | Schriefer et al. | |
| 2011/0240320 A1* | 10/2011 | Umemura et al. | 173/46 |
| 2011/0260681 A1 | 10/2011 | Guccione et al. | |
| 2012/0045684 A1 | 2/2012 | Gadawski | |
| 2012/0078727 A1 | 3/2012 | Lee | |
| 2012/0104867 A1* | 5/2012 | Mudrick | H02J 7/025 307/104 |
| 2012/0187184 A1 | 7/2012 | Challa et al. | |
| 2012/0208454 A1 | 8/2012 | Chai | |
| 2012/0271903 A1 | 10/2012 | Luna | |
| 2012/0317194 A1 | 12/2012 | Tian | |
| 2013/0029596 A1 | 1/2013 | Preston et al. | |
| 2013/0045684 A1 | 2/2013 | Linde et al. | |

FOREIGN PATENT DOCUMENTS

| | | | |
|---|---|---|---|
| WO | WO2008038203 | 4/2008 | |
| WO | WO 2008038203 A2 * | 4/2008 | H02J 7/02 |
| WO | WO2009050624 | 4/2009 | |
| WO | WO2010035256 | 4/2010 | |
| WO | WO2010093969 | 8/2010 | |
| WO | WO 2010093969 A2 * | 8/2010 | H04B 5/00 |

OTHER PUBLICATIONS

U.S. Appl. No. 13/644,256, filed Oct. 3, 2012, "Method and Apparatus for Using Near Field Communication (NFC) to Perform Transactions on a Mobile Device", Clement et al., 32 pages.

* cited by examiner

METHOD AND APPARATUS FOR CHARGING A BATTERY IN A MOBILE DEVICE THROUGH A NEAR FIELD COMMUNICATION (NFC) ANTENNA

CROSS REFERENCE TO RELATED APPLICATIONS

The present disclosure claims priority to U.S. Patent Application No. 61/570,767, filed on Dec. 14, 2011, which is incorporated herein by reference.

BACKGROUND

The background description provided herein is for the purpose of generally presenting the context of the disclosure. Work of the presently named inventor(s), to the extent it is described in this background section, as well as aspects of the description that may not otherwise qualify as prior art at the time of filing, are neither expressly nor impliedly admitted as prior art against the present disclosure.

Many modern mobile devices (e.g., smart phones) incorporate near field communication (NFC) chips and antennas. NFC is a wireless technology that allows two devices to wirelessly communicate over a short distance of about 10 cm or less. NFC is standardized internationally within NFC Forum specifications and defined in, for example, ISO/IEC 18092, ISO/IEC 18000-3, ISO/IEC 21481, ECMA-340, ISO 14443, and the like, and any previous or subsequent versions. NFC technology is commonly used for contactless, short-range communications based on radio frequency identification (RFID) standards, using electromagnetic field induction to enable communication between electronic devices, including mobile devices.

Cordless charger pads currently exist that allow for wireless charging of a battery of a mobile device without having to plug the mobile device into a wall outlet, USB port, or the like. FIG. 1 schematically illustrates an example wireless charging system 100. There are currently two different accessories required for wireless charging, namely a charging station 102 and a charging receiver 104.

Charging station 102 includes an integrated antenna (not shown). Charging receiver 104 includes an integrated antenna 106 and a charging interface 108. Charging receiver 104 fits around, or attaches to, a mobile device 110. The combination of charging receiver 104 attached to mobile device 110 is placed on charging station 102. Charging receiver 104 then inductively receives energy via antenna 106 from an electromagnetic field generated by charging station 102. This energy is then transferred via charging interface 108 to mobile device 110 and used to charge the battery (not shown) in mobile device 110.

Mobile device 110 may be equipped with NFC technology, including an NFC antenna. However, it is antenna 106 in charging receiver 104, as opposed to the NFC antenna, that is used to charge the battery in mobile device 110. Thus, a user is required to use a separate charging receiver to charge a mobile device and if a user were to have a variety of mobile devices, each of the mobile devices would require their own custom charging receiver 104 to use wireless charging.

SUMMARY

In various embodiments, the present disclosure provides a method of wirelessly charging a battery in a mobile device that includes a near field communication (NFC) antenna by detecting a current induced in the mobile device from the NFC antenna and determining whether the current induced in the mobile device is above a predetermined threshold for longer than a predetermined duration. If the current induced in the mobile current is determined to be above the predetermined threshold for longer than the predetermined duration, the current induced in the mobile device that is above the predetermined threshold is used to charge the battery in the mobile device. The present disclosure also provides, in various embodiments, a method of monitoring a level of a current induced in a near field communication (NFC) antenna coupled to a NFC module embedded in the mobile device to determine whether the level of the current induced in the NFC antenna is above a specified threshold level and persists for longer than a specified time duration. In response to determining that the current induced in the NFC antenna is above the specified threshold for longer than the specified time duration, the current induced in the NFC antenna is directed to a power management module for conditioning the current induced in the NFC antenna above the specified threshold to charge the battery.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
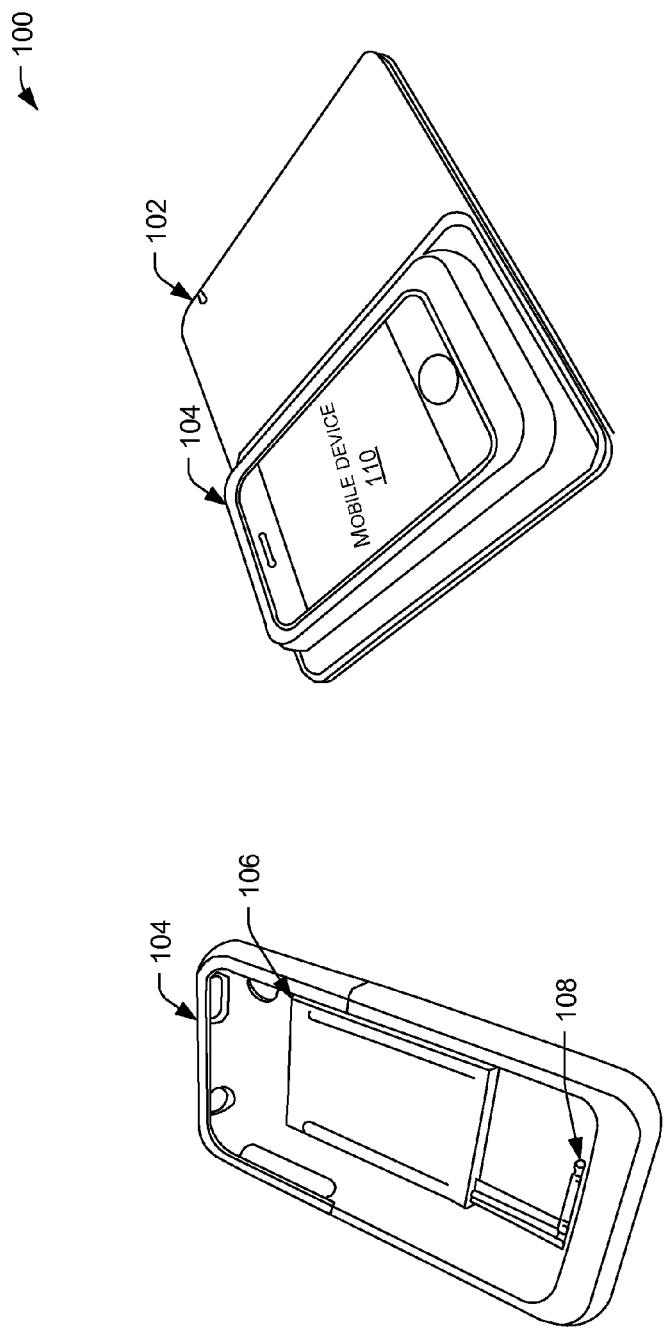
FIG. 1 schematically illustrates an example wireless charging system.
Figure 2:
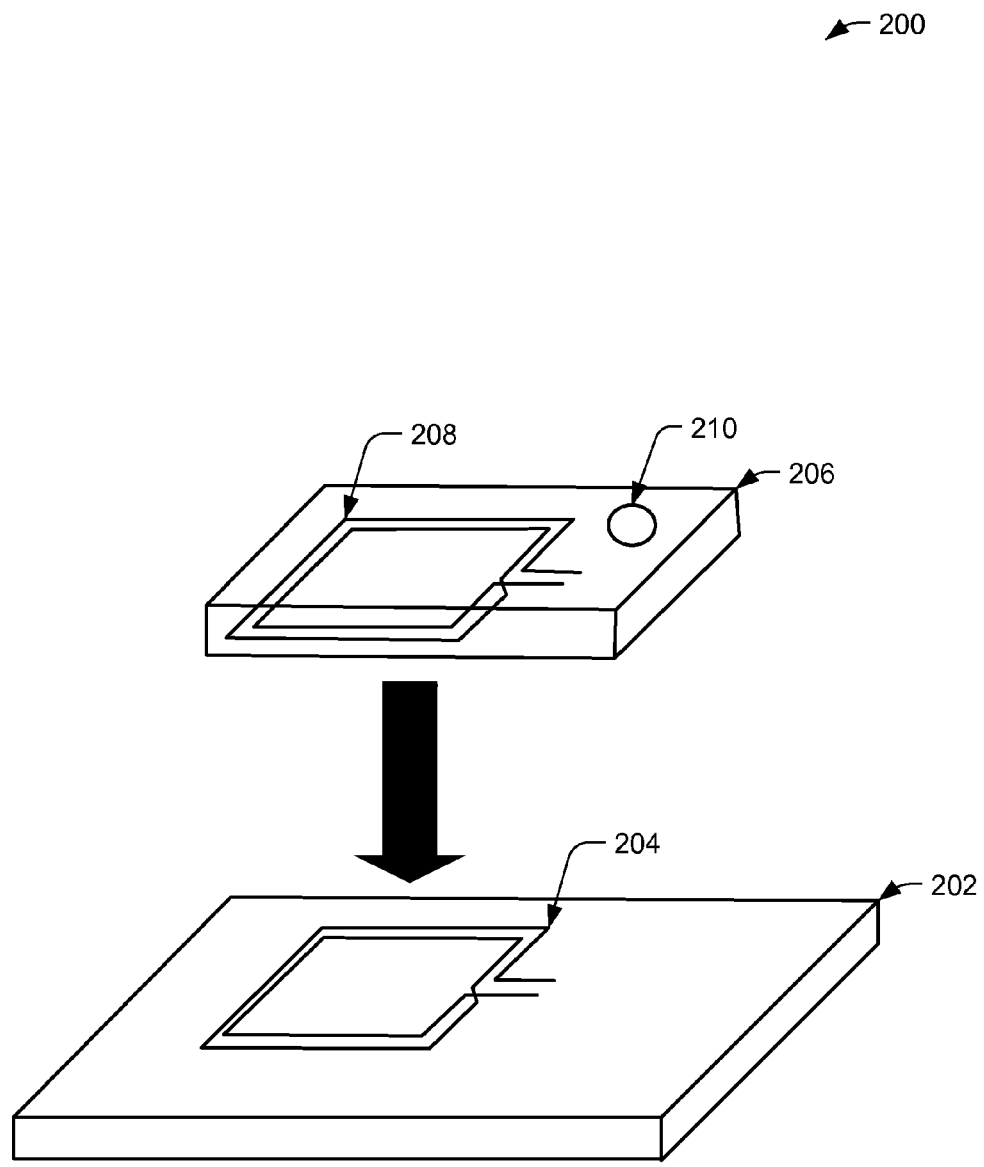
FIG. 2 schematically illustrates an alternate example wireless charging system that uses an NFC antenna embedded in a mobile device.

FIG. 2 schematically illustrates an alternate example wireless charging system 200 including a charging station 202 to charge a battery within a mobile device 206. Charging station 202 includes an antenna 204 that generates an electromagnetic field suitable to induce a current in an NFC enabled device. Mobile device 206 represents a device equipped with NFC technology (not shown), including an NFC antenna 208. As mobile device 206 is placed very close to, or on the surface of, charging station 202, NFC antenna 208 in mobile device 206 inductively receives electromagnetic energy transmitted by antenna 204 of charging station 202. This energy is then used to charge the battery (not shown) in mobile device 206. Mobile device 206 may optionally contain an indicator 210, such as a light emitting diode (LED), to indicate an initiation and/or completion of the battery charging process. Unlike example wireless charging system 100, mobile device 206 does not require charging receiver 104.

NFC antenna 208 is large enough to collect significant power through inductive coupling with antenna 204. As an example, NFC antenna 208 is a large spiral antenna with a length of about 2.5-3 cm. An NFC IP (Intellectual Property) core or block, NFC chip, NFC module, NFC circuit, NFC logic, or the like, as specified by an NCP Interface and Protocol standard, is designed to sustain an electromagnetic field of 12 amps-per-meter (12 A/m) max. Such a field is strong enough to allow collecting the necessary power for charging a battery in many different NFC enabled devices, such as a NFC-enabled portable smartphone extension (for example, as described in U.S. patent application Ser. No. 13/644,256), NFC enabled smartphones, other NFC enabled mobile devices, and the like. In an embodiment, charging station 202 is configured to generate an electromagnetic field of up to 12 A/m.

Figure 3:
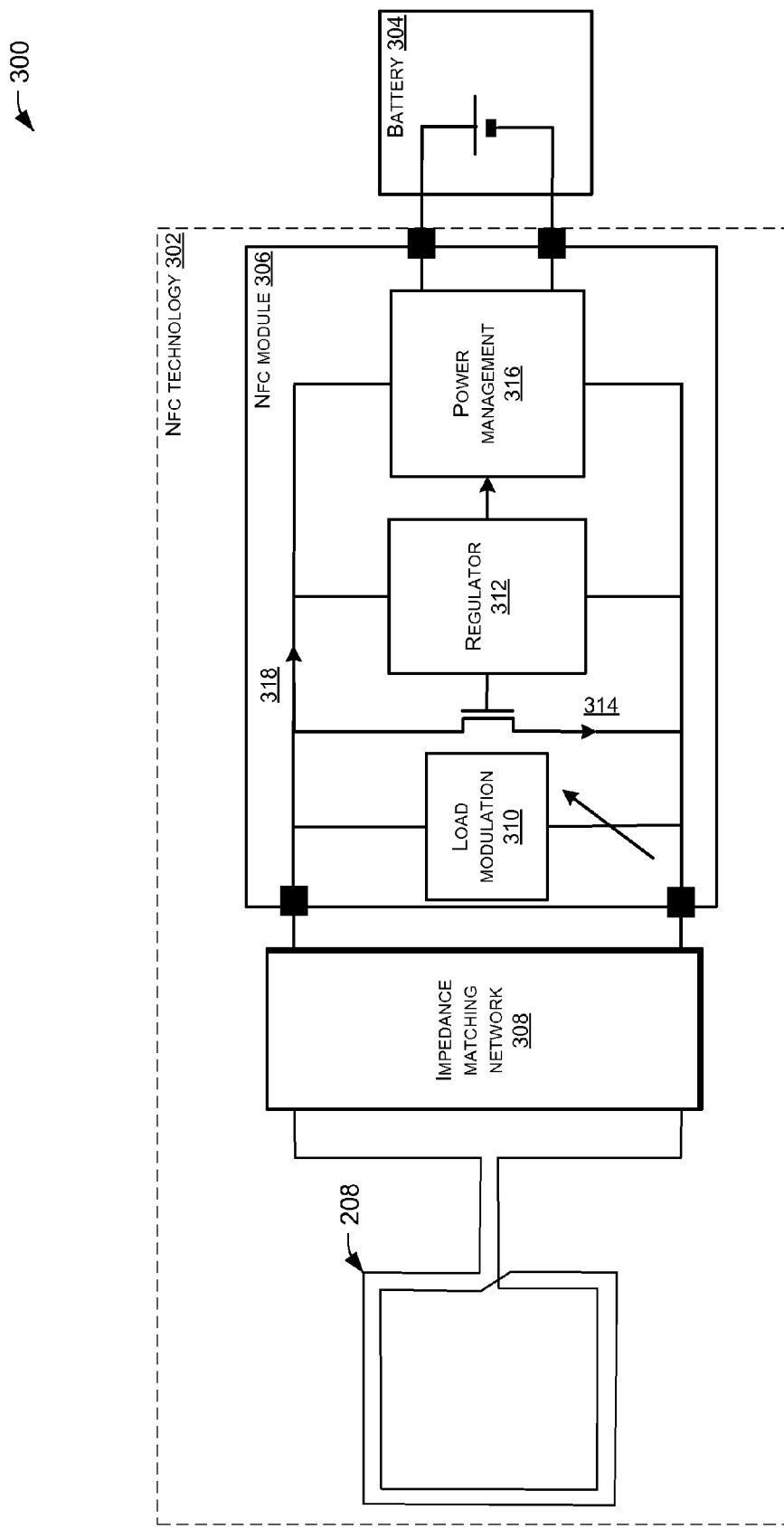
FIG. 3 illustrates an example NFC Technology architecture resident in a mobile device used to charge a battery in the mobile device.

FIG. 3 illustrates an example architecture 300 of NFC Technology 302 resident in mobile device 206 and used to charge a battery 304 in mobile device 206. NFC Technology 302 includes an NFC module 306, an impedance matching network 308 and an NFC antenna 208. Impedance matching network 308 is used to match impedance between NFC module 306 and NFC antenna 208, such as, to facilitate maximization of received and transmitted signal power.

NFC module 306 facilitates near-field communication in mobile device 206. In an embodiment, NFC module 306 is implemented as a part of a System-on-Chip (SoC) that includes memory and at least one processor (not shown). In alternate embodiments, NFC module 306 is implemented as part of an application-specific integrated circuit (ASIC), a field-programmable gate array (FPGA), and/or other electronic circuitry. NFC module 306 includes a load modulation circuit 310 that facilitates modulation of a signal transmitted by NFC module 306 and demodulation of a signal received by NFC module 306. Load modulation circuit 310 facilitates communications at various data rates using various types of modulation as, for example, indicated in NFC Forum specifications.

In an embodiment, a regulator 312 monitors current entering NFC module 306. As an example, regulator 312 monitors current generated during a NFC communication session with a NFC enabled target device, such as an active or passive target device. Depending upon such factors as proximity to a target device, or a transmitted power level of a target device, excessive current levels and/or current spikes may be generated in NFC module 306. Regulator 312 shunts excessive current by controlling a shunting mechanism, such as example shunt transistor 314 shown in FIG. 3. As an example, only tens of milliamps (ma) of current is generally required to facilitate NFC based communications between NFC module 306 and another NFC enabled active or passive device using NFC protocols or standards. Regulator 312 is configured to determine if a current level exceeds a threshold level required for normal NFC communications, and shunt excess current if the current level exceeds the threshold level. As an example, regulator 312 regulates excessive current levels and current spikes to facilitate an automatic gain control, to maintain optimal signal levels for decoding circuitry (not shown) to decode received signals.

NFC transactions commonly take from tens of milliseconds, hundreds of milliseconds to perhaps several seconds or longer. During normal NFC transactions, excessive current levels above a high threshold generally do not persist for the duration of the transaction, especially for longer transactions.

In an alternate embodiment, to facilitate charging of battery 304, regulator 312 is further configured to respond differently to current levels that persist above a high specified or predetermined threshold current level for longer than a specified or predetermined time duration. As an example, if regulator 312 detects that it has shunted an excessive current level above a specified threshold for longer than a specified time duration, regulator 312 will determine that mobile device 206 has been placed in close proximity with charging station 202. In this embodiment, instead of shunting the excess current, regulator 312 will redirect the current, such as current 318, to charge battery 304. In an embodiment, regulator 312 will open shunt transistor 314 to direct current 318 to a power management and charging circuit module, such as power management module 316. In another embodiment, regulator 312 will open shunt transistor 314 and switch current 318 directly to a power management and charging circuit module, such as power management module 316. In yet another embodiment, regulator 312 will stop shunting current and switch current 318, or direct one or more other modules (not shown), to direct current 318 to a power management and charging circuit, such as power management module 316. As an example, NFC module 306 is configured to shunt current above the high predetermined threshold level for a time that is less than or equal to the predetermined time duration. If the current level above the high predetermined threshold level persists for a time greater than the predetermined time duration, NFC module 306 is configured to direct current 318 to charge rechargeable battery 304 in mobile device 206. As an example, the high predetermined threshold level is a hundred or more milliamps of current and the predetermined time duration is a few seconds.

In an embodiment, NFC module 306 contains an integrated power management and charging circuit 316. Power management circuit 306 is configured to appropriately condition current directed to it by regulator 312 to charge battery 304.

Mobile device 206 may contain an alternate power management and charging circuit (not shown) that uses a wired means for charging battery 304. As an example, mobile device 206 may have a USB interface, or power connector for use in charging battery 304. Thus, in an alternate embodiment, regulator 312 is configured to direct current to the alternate power management and charging circuit for charging battery 304.

In an embodiment, NFC module 306 is configured to control indicator 210 to indicate an initiation and/or completion of the battery charging process. As an example, indicator 210 allows a user to verify that mobile device 206 has made appropriate contact with charging station 202, that regulator 312 has properly detected contact between mobile device 206 and charging station 202 and directed current to power management circuitry 316 such that battery charging has initiated. In an embodiment, NFC module 306 is configured to control indicator 210 to indicate to a user when the battery charging process has concluded. As an example, NFC module 306 is configured to detect when rechargeable battery 304 is substantially fully charged, and to control indicator 210 to indicate that charging of the rechargeable battery is complete. In an embodiment, power management module 316 is configured to determine if rechargeable battery 304 is substantially fully charged.

Example Methods of Operation

Figure 4:
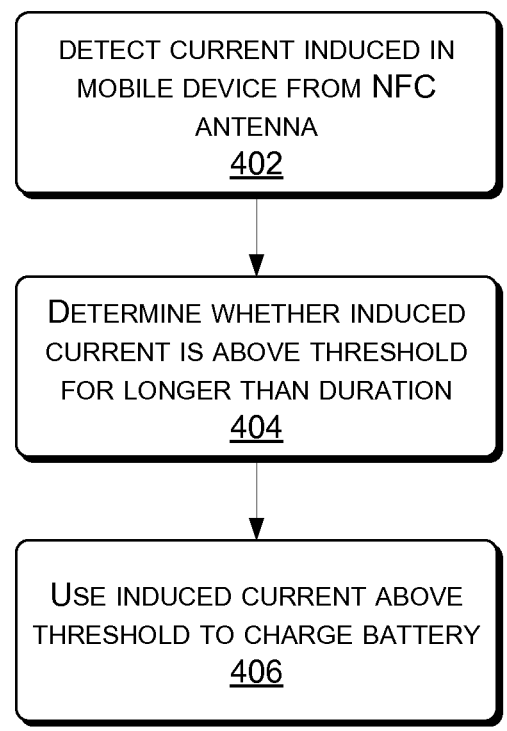
FIG. 4 illustrates an example method of wirelessly charging a battery by wirelessly inducing current in a NFC antenna in a mobile device.

FIG. 4 illustrates an example method 400 of wirelessly charging a battery by wirelessly inducing current in a NFC antenna embedded in a mobile device. At block 402, an current induced in the mobile device from a NFC antenna in a mobile device is detected. At block 404, a determination is made whether the current induced in the mobile device is above a predetermined threshold for longer than a predetermined duration. As an example, regulator 312 detects a shunt current at 314 over 100 ma that lasts for longer than 2.5 seconds. At block 406, in response to determining that the current induced in the mobile device is above the predetermined threshold for longer than a predetermined duration, the current induced in the mobile device that is above the predetermined threshold is used to charge the battery in the mobile device, such as rechargeable battery 304 in mobile device 206. As an example, current regulator 312 directs current shunted at 314 to current 318 in NFC module 306 to charge battery 304.

In example method 400, NFC antenna 208, as well as NFC module 306 coupled to NFC antenna 208 is embedded in mobile device 206, and it is NFC module 306 that performs the detecting the current induced in mobile device 206 above the predetermined threshold for longer than the predetermined duration. NFC module 306 is also configured to wirelessly communicate with another NFC enabled device via a NFC communications protocol, such as NFC Forum specifications as defined in, for example, ISO/IEC 18092, ISO/IEC 18000-3, ISO/IEC 21481, ECMA-340, and ISO 14443, and the like, and any previous or subsequent versions. As an example, NFC module 306 also contains power management module 316, and current regulator 312 directs current 318 to power management module 316, which conditions current 318 to charge battery 304.

Figure 5:
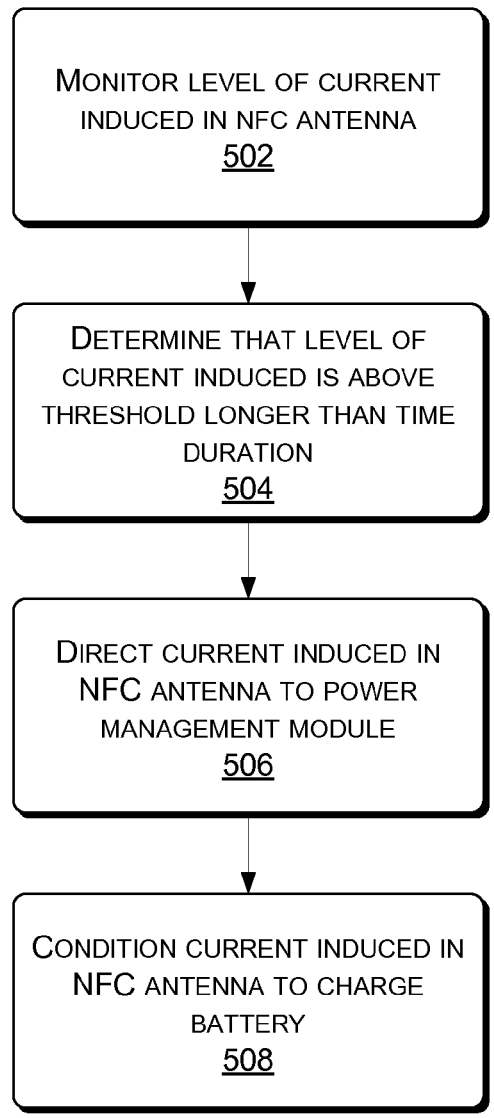
FIG. 5 illustrates another example method of wirelessly charging a battery by wirelessly inducing current in a NFC antenna in a mobile device.

FIG. 5 illustrates an example method 500 of wirelessly charging a battery by wirelessly inducing current in a NFC antenna in a mobile device. At block 502, a level of an current induced in a NFC antenna coupled to a NFC module embedded in the mobile device is monitored. At 504, a determination is made that the level of the current induced in a NFC antenna as measured in the NFC module is above a specified threshold level for longer than a specified time duration. As an example, the NFC module is implemented as part of a System-on-Chip (SoC) in the mobile device with memory and a processor. Therefore, the SoC may be programmed or configured to store various threshold levels, such as the specified threshold level and the specified time duration accessible by the NFC module.

At block 506, in response to determining that the current induced in the NFC antenna is above the specified threshold for longer than the specified time duration, the current induced in the NFC antenna above the specified threshold is directed to a power management module. In an embodiment, the current induced in the NFC antenna is directed to power management module 316 that is part of NFC module 306. In an alternate embodiment, NFC module 306 directs the induced current to a different power management and charging circuit module in mobile device 206. At block 508, the power management and charging circuit module, such as power management module 316, conditions the current induced in the NFC antenna above the specified threshold to charge rechargeable battery 304.

As an example, when mobile device 206 is placed on charging station 202, a current is induced in NFC antenna 208 embedded in mobile device 206. NFC module 306 detects a resultant current, such as shunt current at 314 or current 318 in NFC module 306, that is at a level above a specified threshold level for longer than a specified time duration. The resultant current is then directed by NFC module 306 to charge battery 304 in mobile device 206. An LED or other indicator 210 indicates that charging is occurring and when charging has completed.

CONCLUSION

Note that the description above incorporates use of the phrases "in an aspect," "in an embodiment," or "in various embodiments," or the like, which may each refer to one or more of the same or different embodiments. Furthermore, the terms "comprising," "including," "having," and the like, as used with respect to embodiments of the present disclosure, are synonymous.

As used herein, the terms "logic," "component," "circuit," and "module" may refer to, be part of, or include an Application Specific Integrated Circuit (ASIC), System-on-Chip (SoC), an electronic circuit, a processor (shared, dedicated, or group) and/or memory (shared, dedicated, or group) that execute one or more software or firmware programs, a combinational logic circuit, and/or other suitable components that provide the described functionality. The logic and functionality described herein may be implemented by any such components.

In accordance with various embodiments, an article of manufacture may be provided that includes a storage medium having instructions stored thereon that, if executed, result in the operations described above. In an embodiment, the storage medium comprises some type of non-transitory memory (not shown). In accordance with various embodiments, the article of manufacture may be a computer-readable medium such as, for example, software or firmware.

Various operations may have been described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

Although the present disclosure describes embodiments having specific structural features and/or methodological acts, it is to be understood that the claims are not necessarily limited to the specific features or acts described. Rather, the specific features and acts are merely illustrative of some embodiments that fall within the scope of the claims of the present disclosure.

What is claimed is:

1. A method of wirelessly charging a battery in a mobile device, the mobile device including a near field communication (NFC) antenna, the method comprising:
   detecting a current induced in the mobile device from the NFC antenna;
   in response to the detected current induced in the NFC antenna being higher than a first threshold level, shunting at least part of the detected current, wherein the first threshold level is higher than a range of current used for NFC based communication by the mobile device; and
   in response to (i) shunting at least part of the detected current for longer than a predetermined time duration and (ii) at least part of the detected current that is being shunted being higher than a second threshold level for the predetermined time duration, using the current induced in the mobile device to charge the battery in the mobile device.

2. The method of claim 1, wherein the NFC antenna is embedded in the mobile device.

3. The method of claim 2, wherein:
   the mobile device comprises a NFC module coupled to the NFC antenna; and
   the NFC module is configured to perform the detecting of the current induced in the mobile device.

4. The method of claim 3, wherein the NFC module enables the mobile device to wirelessly communicate with another NFC enabled device via a NFC communications protocol.

5. The method of claim 1, wherein:
the mobile device further comprises a power management module; and
using the current to charge the battery in the mobile device comprises directing the current to the power management module.

6. The method of claim 5, wherein using the current induced in the mobile device to charge the battery in the mobile device comprises conditioning the current to charge the battery in the mobile device.

7. The method of claim 1, wherein the second threshold level is higher than the first threshold level.

8. The method of claim 1, further comprising:
refraining from shunting at least part of the detected current while the rechargeable battery in the mobile device is being charged; and
refraining from charging the rechargeable battery in the mobile device while at least part of the detected current is being shunted.

9. A mobile device comprising:
a rechargeable battery;
a near field communication (NFC) antenna; and
a NFC module coupled to the NFC antenna, the NFC module configured to
detect a level of a current induced in the NFC antenna,
in response to the detected level of current induced in the NFC antenna being higher than a first threshold level, shunt at least part of the current induced in the NFC antenna, wherein the first threshold level is higher than a range of current used for NFC based communication by the mobile device, and
in response to (i) shunting at least part of the current induced in the NFC antenna for longer than a predetermined time duration and (ii) at least part of the current induced in the NFC antenna that is being shunted being higher than a second threshold level for the predetermined time duration, charge the rechargeable battery in the mobile device using the current induced in the NFC antenna.

10. The mobile device of claim 9, wherein:
the first threshold level is less than the second threshold level; and
the current being shunted is not used for charging the rechargeable battery.

11. The mobile device of claim 9, further comprising:
a power management module, wherein the NFC module is configured to direct the current induced in the NFC antenna that is higher than the second threshold level for the predetermined time duration to the power management module to charge the rechargeable battery in the mobile device.

12. The mobile device of claim 9, wherein the NFC module is implemented as part of a System-on-Chip (SoC) in the mobile device.

13. The mobile device of claim 9, wherein the NFC module includes a regulator and a power management module.

14. The mobile device of claim 13, wherein the regulator is configured to:
detect the level of the current induced in the NFC antenna that is higher than the second threshold level for longer than the predetermined time duration; and
direct the current induced in the NFC antenna that is higher than the second threshold level for longer than the predetermined time duration to the power management module.

15. The mobile device of claim 9, wherein the NFC module is configured to control an indicator to indicate that the rechargeable battery is charging.

16. The mobile device of claim 9, wherein the NFC module is configured to detect when the rechargeable battery is substantially fully charged, and to control an indicator to indicate that charging of the rechargeable battery is complete.

17. The mobile device of claim 9, wherein the NFC module comprises a transistor configured to shunt at least part of the current induced in the NFC antenna.

18. The mobile device of claim 9, wherein the NFC module is configured to refrain from shunting at least part of the current induced in the NFC antenna, while the rechargeable battery in the mobile device is being charged.

19. The mobile device of claim 9, wherein while at least part of the current induced in the NFC antenna is being shunted, the NFC module is configured to refrain from charging the rechargeable battery in the mobile device.

20. The mobile device of claim 9, wherein the second threshold level is higher than the first threshold level.

* * * * *